Feb. 5, 1963 E. F. FABISH 3,076,387
GEAR HOB AND MOUNTING THEREOF
Filed March 13, 1959
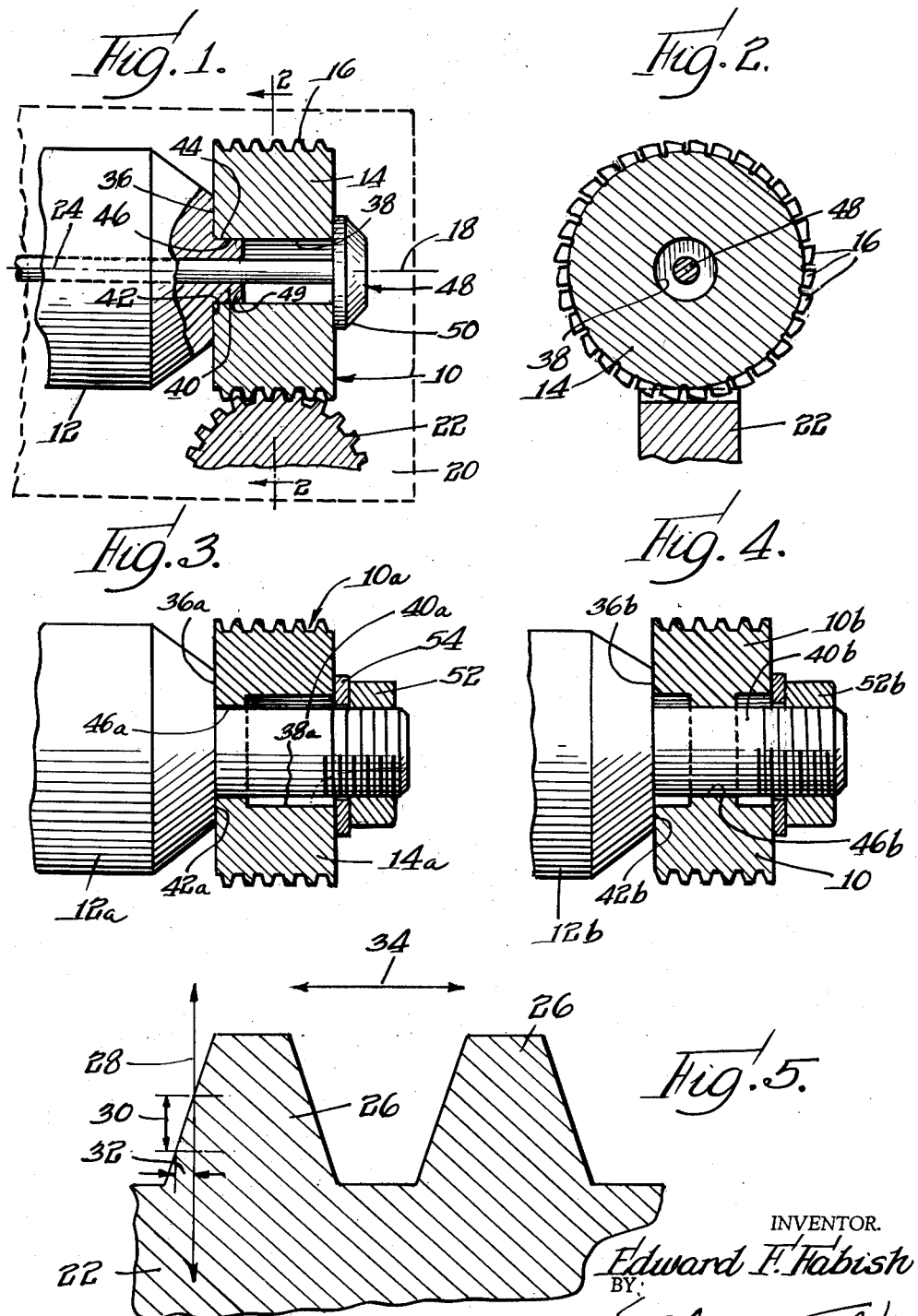
INVENTOR.
Edward F. Fabish
BY
Olson & Trexler
Attys United States Patent Office 3,076,387
Patented Feb. 5, 1963

3,076,387
GEAR HOB AND MOUNTING THEREOF
Edward F. Fabish, Glenview, Ill., assignor to Illinois Tool Works Inc., a corporation of Delaware
Filed Mar. 13, 1959, Ser. No. 799,304
5 Claims. (Cl. 90—1)

The present invention relates to gear hobs and more particularly to the mounting of gear hobs on rotary support spindles.

One object of the invention is to mount a gear hob on a rotary support spindle in an improved manner which assures, during use of the hob, a parallel relationship between the rotary axis of the support spindle and the axis of the hob around which is formed the circumferential series of cutting teeth on the hob.

A further object is to mount a gear hob on a rotary support spindle in an improved manner which effectively eliminates both angular and radial misalinement of the central axis of the spindle and the central axis of the hob about which the hob teeth are formed.

Another object is to provide an improved gear hob and an improved spindle mounting for the hob which effectively eliminates weaving of the hob when rotated by the spindle.

Other objects and advantages will become apparent from the following description of the exemplary forms of the invention illustrated in the drawings, in which:

FIG. 1 is a partially sectioned side view showing a gear hob mounted on a rotary spindle in accordance with the invention and illustrating the position of a workpiece relative to the hob;

FIG. 2 is a transverse sectional view taken along the line 2—2 of FIG. 1;

FIG. 3 is a partially sectioned side view of a modified embodiment of the invention;

FIG. 4 is a partially sectioned side view of a second modified embodiment of the invention; and FIG. 5 is a fragmentary sectional view, on an enlarged scale, of typical gear teeth cut by hobbing.

Having reference to the drawings in greater detail, FIG. 1 shows a gear hob 10 mounted on a rotary support spindle 12 and comprising a cylindrical body 14. A circumferential series of cutting or hobbing teeth 16 is formed on the periphery of the body 14 and extends along the length of the hob 10 in concentric relation to the central axis 18 of the hob itself.

The rotary support spindle 12 for the hob 10 forms a part of a conventional hobbing machine 20 (illustrated in phantom in FIG. 1) which positions the hob in cutting relation to a workpiece 22, and to this end controls the position of the rotary axis 24 of the spindle 12 relative to the workpiece.

Regardless of how accurately the machine 10 controls the position of axis 24 of the hob spindle relative to the workpiece 22, inaccuracies or variations in the form of the teeth cut by the hob commonly arise from two causes that are the concern of the present invention. Some consideration of these causes of error facilitates an understanding of this invention, which overcomes these problems.

Their effect in producing variations in the form of teeth 26 hobbed in the workpiece 22 can be visualized with reference to FIG. 5.

One cause of variations in the form of hobbed teeth 26 arises from a radial misalignment of the rotary axis 24 of the spindle 12 and the axis 18 of the series of cutting teeth 16 on the periphery of the hob 10. When this occurs there is a variation around the hob in the radial spacing of the cutting teeth 16 from the rotary axis 24 of the spindle. The effect of this is to vary in a direction perpendicular to the spindle axis 24 the depth to which the teeth 16 cut into the workpiece 22. The direction, relative to the workpiece 22, in which the variation in depth occurs is indicated in FIG. 5 by the double ended arrow 28. Variations of this character are known as "O.D. run-out."

However, due to the pitch of the teeth 26, the variation in the width or form of the teeth 26 due to variations in cutting depth are much less than the actual variations in cutting depth.

The reduced ratio of tooth width variations to cutting depth variations is illustrated in FIG. 5 in which a cutting depth variation, indicated by the numeral 30, produces a tooth width variation, indicated by the numeral 32, which is only one third of the depth variation. The amount of such variations is exaggerated in FIG. 5 to better illustrate the ratio of the variations. For teeth of a pitch higher than those illustrated, the tooth width to cutting depth ratio may be only one to four, one to five, or even one to six.

A more serious cause of variations in the form of hobbed teeth 26 can be "weaving" or wobbling of the hob 10 due to an angular misalignment or lack of parallelism between the axis 18 of the hob itself and the spindle axis 24 about which the hob is rotated. The effect of this is to produce an axial displacement relative to each other of corresponding hob teeth 16 on diametrically opposite sides of the hob 10. In other words hob teeth 16 are displaced from their proper positions in directions parallel to the spindle axis 24.

The direction of this cutting tooth displacement relative to the workpiece teeth 26 is indicated by the double ended arrow 34 in FIG. 5. It will be seen that axial displacement of the hob teeth 16 or variations in the axial positions of the hob teeth due to "weaving" of the hob produce corresponding variations in the width or form of the workpiece teeth 26 at a one-to-one ratio rather than at the reduced ratio characteristic of "O.D. run-out" previously mentioned.

In accordance with this invention, the hob 14 is mounted on the rotary support spindle 12 in an improved and very simple manner which positively assures a parallel alignment of the central axis 18 of the hob 10 with the central axis 24 of the spindle 24 about which both the spindle and hob are rotated (thus eliminating "weaving" of the hob, a major cause of tooth form error) and which at the same time provides an exact coaxial alignment of the central axes of the hob and spindle (thereby effectively eliminating errors in tooth form due to "O.D. run-out").

To this end the invention provides a precisely flat annular datum surface 36 of a rather extensive width and large diameter on one end face of the hob body 14, FIG. 1. The datum surface encircles an axial bore 38 through the hob 10 and extends a substantial distance radially outward from the bore 38. Actually the datum surface 36, which is ground perfectly flat, may extend entirely across one end or hub of the hob. It is precisely perpendicular to the axis of the circumferential series of hob teeth 16. This relationship of the surface 36 and axis 18 may be achieved by grinding the surface 36 first and using it as a datum surface for grinding the hob teeth.

The axial bore 38 in the hob 10 is made precisely coaxial with the hob axis 18 and receives an arbor 40 projecting centrally from the hob end of the spindle 12.

The hob end of spindle 12 is ground to form a precisely flat datum surface 42 encircling the arbor 40 in precisely perpendicular relation to the spindle axis 24 and having a rather extensive radial width and large diameter corresponding to the hob datum surface 36.

Thus a solid mutual engagement of the hob datum surface 36 and the spindle datum surface 42, which engagement is uniform all around the arbor 40, will positively assure parallelism between the spindle axis 24 and the hub axis 18.

Engagement of the two datum surfaces 36, 42 is effected by an axial force applied to the hob 10. More significant, however, is the provision for securing the hob 10 in exact coaxial alignment with the spindle 12 while at the same time assuring a solid mutual engagement of the datum surfaces 36, 42 which is uniform all around the arbor 40.

To accomplish this, the arbor 40 and the inner periphery of the hob body 14 defining the bore 38 are shaped to define two opposed, cylindrical bearing surfaces fitting closely together without radial play and having just sufficient width along the axis of the hob to withstand the radial load on the hob in use while at the same time being so limited in width that the support provided to these radial bearing surfaces by the structure of arbor and hob is sufficiently yieldable under the influence of axial force urging the datum surfaces 36, 42 together as to eliminate any effect the radial bearing surfaces might otherwise have in creating an angular misalignment of the hub axis 18 and the spindle axis 24.

Coacting radial bearing surfaces of this character are provided as shown in FIG. 1 by making the arbor 40 very short. The hob 10 shown is designed for high pitch teeth. In this instance the arbor is only one-eighth inch long. Hence, its radial bearing surface 44 and the opposing radial bearing surface 46 of the hob body 14 are only one-eighth inch wide. This is sufficient to sustain the radial load on the hob and at the same time provide the necessary yieldability.

When a short stub arbor 40 is used as shown in FIG. 1, the datum surfaces 36 and 42 are pressed together by a pull-up or tension bar 48 extending through the spindle 12 and hob bore 38 and having a head 50 engaging the end of the hob 10 opposite the spindle.

Where use of a pull-up bar is impractical or undesirable, alternative constructions may be used.

As illustrated in FIG. 3, in which counterparts of elements described in connection with FIG. 1 are designated with the same reference numerals with the addition of the suffix a, the arbor 40a is extended all the way through the hob bore 38a. The hob bore 38a is counter-bored from the end opposite the spindle 12a, as shown, to reduce to one-eighth inch the effective length of the radial bearing area 46a of the hob body 14a on the arbor 40a. A nut and washer 52, 54 on the outer end of the arbor 40a apply axial force to the hob 10a.

As shown in FIG. 4 illustrating another modified construction, in which counterparts of components previously described are designated with the same reference numerals with the added suffix b, the hob 10b is counter-bored from opposite ends leaving in the center a radial bearing surface 46b, only slightly wider than the bearing surface 46a, FIG. 3, for engagement with the arbor 40b.

It will be understood that the invention is not necessarily limited to specific forms disclosed but includes variants within the scope of the invention as defined by the claims.

The invention is claimed as follows:

1. A spindle mounted gear hob comprising, in combination, a spindle adapted for rotation about the central axis thereof and defining an arbor of reduced cross section projecting from one end thereof, said spindle having a precisely flat annular datum surface of extensive radial width around the juncture between said spindle and said arbor in precisely machined perpendicular relation to the spindle axis, a gear hob body having a central bore therethrough and having on one face thereof a precisely flat annular datum surface of extensive radial width encircling said bore, said hob body defining on the outer periphery thereof a circumferential series of hob teeth concentric about the central axis thereof and with the datum surface on said hob body precisely machined perpendicular to the central axis of the hob body, said arbor projecting into the hob bore and defining a cylindrical bearing surface perpendicular to the datum surface on said spindle, the hob bore defining a cylindrical bearing surface perpendicular to the datum surface on the hob body and having continuous circumferential bearing engagement with the bearing surface provided by the arbor, and retaining means having a center axis coincident with the spindle and hob axes and having means overlying and engaging the face of the hob body remote from the spindle to urge the same axially toward the spindle to effect mutual engagement of the said datum surfaces, said arbor bearing surface and said hob bearing surface being longitudinally dimensioned and positioned relative to each other to provide limited mutual engagement therebetween over only a relatively small fractional part of the axial extent of the hob body for providing radial support to the hob body sufficient to sustain normal radial loads on the hob teeth and at the same time providing yieldability in the support for the hob body under reactions of said retaining means and said datum surfaces effecting uniform mutual engagement of said datum surfaces around the arbor.

2. A spindle mounted gear hob as claimed in claim 1, wherein the arbor extends into the hob bore for only a relatively small fractional part of the axial extent of the hob to provide the cylindrical bearing surface, and wherein the retaining means comprises a tension bar having a head for engaging the opposite face of the hob body.

3. A spindle mounted gear hob as claimed in claim 1, wherein the arbor extends through the hob bore with the retaining means carried at the remote end thereof.

4. A spindle mounted gear hob as claimed in claim 1, wherein the hob is counter-bored from one end thereof to provide the hob bearing surface of a length only a relatively small fractional part of the axial extent of the hob body.

5. A spindle mounted gear hob as claimed in claim 1, wherein the hob is counter-bored from opposite ends thereof to provide the hob bearing surface of limited axial extent disposed intermediate opposite faces of the hob body.

References Cited in the file of this patent

UNITED STATES PATENTS

| | | |
|---|---|---|
| 559,012 | Warren | Apr. 28, 1896 |
| 1,820,409 | Trbojevich | Aug. 25, 1931 |
| 2,126,178 | Drummond | Aug. 19, 1938 |
| 2,361,324 | Severson | Oct. 24, 1944 |
| 2,370,894 | Walters | Mar. 6, 1945 |
| 2,371,089 | Weddell | Mar. 6, 1945 |
| 2,506,082 | Hartman | May 2, 1950 |
| 2,557,751 | Melzer | June 19, 1951 |
| 2,646,723 | Donohoe | July 28, 1953 |
| 2,792,764 | Carlsen et al. | May 21, 1957 |
| 2,828,672 | McMullen | Apr. 1, 1958 |